(12) United States Patent
Lv et al.

(10) Patent No.: US 12,015,443 B2
(45) Date of Patent: Jun. 18, 2024

(54) VISIBLE LIGHT COMMUNICATION SYSTEM

(71) Applicant: SHENZHEN TECHNOLOGY UNIVERSITY, Shenzhen (CN)

(72) Inventors: Zhijian Lv, Shenzhen (CN); Lulu Zha, Shenzhen (CN); Jinpeng Tian, Shenzhen (CN); Wenwei Zhang, Shenzhen (CN)

(73) Assignee: SHENZHEN TECHNOLOGY UNIVERSITY, Shenzhen (CN)

( * ) Notice: Subject to any disclaimer, the term of this patent is extended or adjusted under 35 U.S.C. 154(b) by 0 days.

(21) Appl. No.: 18/272,795

(22) PCT Filed: Oct. 25, 2022

(86) PCT No.: PCT/CN2022/127179
§ 371 (c)(1),
(2) Date: Jul. 17, 2023

(87) PCT Pub. No.: WO2024/050934
PCT Pub. Date: Mar. 14, 2024

(65) Prior Publication Data
US 2024/0088999 A1 Mar. 14, 2024

(30) Foreign Application Priority Data
Sep. 8, 2022 (CN) .......................... 202211092797.3

(51) Int. Cl.
*H04B 10/116* (2013.01)
*H04B 10/516* (2013.01)

(52) U.S. Cl.
CPC ......... *H04B 10/116* (2013.01); *H04B 10/516* (2013.01)

(58) Field of Classification Search
CPC . H04B 10/11; H04B 10/1125; H04B 10/1129; H04B 10/1143; H04B 10/60
See application file for complete search history.

(56) References Cited

U.S. PATENT DOCUMENTS

| 10,348,404 | B1 | 7/2019 | Herman et al. |
| 2013/0089289 | A1* | 4/2013 | Sorin ........................ G02B 6/32 385/33 |
| 2018/0138977 | A1 | 5/2018 | Aoyama et al. |
| 2022/0345221 | A1* | 10/2022 | Mitchell ............ H04B 10/1121 |

(Continued)

FOREIGN PATENT DOCUMENTS

| CN | 203225681 U | 10/2013 |
| CN | 103746741 A | 4/2014 |
| CN | 105337665 A | 2/2016 |

(Continued)

*Primary Examiner* — Pranesh K Barua

(57) ABSTRACT

Provided is a visible light communication system. The system includes a modulation and light emission module configured to emit a communication light ray obtained by modulating information to be communicated; and a tracking and light sensing module configured to receive and demodulate the communication light ray to obtain the information to be communicated and further configured to align the tracking and light sensing module with the communication light ray according to the angle between the tracking and light sensing module and the communication light ray.

7 Claims, 4 Drawing Sheets

(56) References Cited

U.S. PATENT DOCUMENTS

2023/0291473 A1* 9/2023 Furuyama .............. H04B 10/60
    398/29

FOREIGN PATENT DOCUMENTS

| CN | 106533559 A |   | 3/2017 |
|----|-------------|---|--------|
| CN | 107979419 A |   | 5/2018 |
| CN | 108036271 A |   | 5/2018 |
| CN | 109617613 A |   | 4/2019 |
| CN | 210297704 U | * | 4/2020 |
| CN | 111953416 A |   | 11/2020 |
| CN | 112491470 A |   | 3/2021 |
| CN | 115173944 A |   | 10/2022 |

* cited by examiner

VISIBLE LIGHT COMMUNICATION SYSTEM

CROSS-REFERENCE TO RELATED APPLICATIONS

This is a national stage application filed under 37 U.S.C. 371 based on International Patent Application No. PCT/CN2022/127179, filed Oct. 25, 2022, which claims priority to Chinese Patent Application No. 202211092797.3 filed with the China National Intellectual Property Administration (CNIPA) on Sep. 8, 2022, the disclosures of which are incorporated herein by reference in their entireties.

TECHNICAL FIELD

Embodiments of the present application relate to the technical field of visible light communication, for example, a visible light communication system.

BACKGROUND

Visible light communication (VLC) has become a wireless communication method with a broad prospect. The use of an optical carrier frequency allows the significant expansion of an available spectrum at multiple orders of magnitude, highly spatial multiplexing, and the possibility of communication at a higher data rate. Before VLC is put into use, a receiving end needs to be manually aligned with an emitting end, and during use, the angle of the receiving end may deviate, affecting a communication effect. Additionally, some light sources relatively small in dimension have relatively low optical power. According to the etendue conservation law in geometrical optics, the field of view (FOV) of a light source is reduced, affecting an alignment degree of the receiving end.

SUMMARY

Embodiments of the present application provide a visible light communication system to implement self-alignment at a receiving end, thereby improving received optical power, a signal-to-noise ratio, and a bit error rate in a visible light communication process.

Embodiments of the present application provide a visible light communication system. The system includes a modulation and light emission module configured to emit a communication light ray obtained by modulating information to be communicated; and a tracking and light sensing module configured to receive and demodulate the communication light ray to obtain the information to be communicated and further configured to align the tracking and light sensing module with the communication light ray according to the angle between the tracking and light sensing module and the communication light ray.

In an exemplary embodiment, the tracking and light sensing module includes a light tracking sensor configured to generate light sensing signals of multiple regions according to amounts of the communication light ray received in different regions; a tracking circuit configured to generate a motor driving signal according to the light sensing signals of the multiple regions; and an electric motor configured to adjust a direction of a photosensitive plane of the light tracking sensor according to the motor driving signal to align the tracking and light sensing module with the communication light ray.

In an exemplary embodiment, the light tracking sensor includes a metal wall, and a first photodiode and a second photodiode that are arranged on two sides of the metal wall, where the first photodiode and the second photodiode are configured to generate respective light sensing signals.

In an exemplary embodiment, the first photodiode and the second photodiode are the same in dimension, and the metal wall is perpendicular to a photosensitive surface of the first photodiode and perpendicular to a photosensitive surface of the second photodiode.

In an exemplary embodiment, the tracking circuit includes a comparison unit configured to compare the light sensing signals of the multiple regions; and a switch unit including multiple switch transistors and configured to determine on/off states of the multiple switch transistors according to a comparison result of the comparison unit, control an access direction of a drive voltage of the electric motor according to the on/off states of the multiple switch transistors, and generate the motor driving signal according to the access direction of the drive voltage.

In an exemplary embodiment, the comparison unit includes a first operational amplifier and a second operational amplifier; where the first operational amplifier has a positive input terminal connected to the first photodiode and a negative input terminal connected to the second photodiode; and the second operational amplifier has a positive input terminal connected to the second photodiode and a negative input terminal connected to the first photodiode.

In an exemplary embodiment, the switch unit includes a first switch transistor, a second switch transistor, a third switch transistor, and a fourth switch transistor; where output of the first operational amplifier is used for controlling the second switch transistor and the fourth switch transistor to be turned on or off, and output of the second operational amplifier is used for controlling the first switch transistor and the third switch transistor to be turned on or off; in the case where the second switch transistor and the fourth switch transistor are turned on and the first switch transistor and the third switch transistor are turned off, a positive electrode of the electric motor is connected to the drive voltage and a negative electrode of the electric motor is grounded, and in the case where the first switch transistor and the third switch transistor are turned on and the second switch transistor and the fourth switch transistor are turned off, the negative electrode of the electric motor is connected to the drive voltage and the positive electrode of the electric motor is grounded.

In an exemplary embodiment, multiple light tracking sensors are arranged in an array and connected in parallel.

In an exemplary embodiment, the modulation and light emission module uses a gallium nitride micro light-emitting diode (micro-LED) as a light source, and a modulation manner of the modulation and light emission module is Non-Return-to-Zero On-Off Keying.

In an exemplary embodiment, the system further includes a focusing module configured to focus the communication light ray onto the tracking and light sensing module.

DETAILED DESCRIPTION

Figure 1:
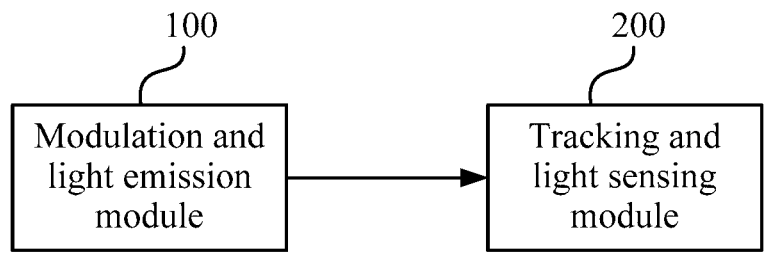
FIG. 1 is a structure diagram of a visible light communication system according to the present application.

The present application is described below in conjunction with drawings and embodiments. It is to be understood that the embodiments described herein are intended to illustrate the present application and not to limit the present application. Additionally, it is to be noted that for ease of description, only part of structures related to the present application are illustrated in the drawings.

Before example embodiments are discussed, it is to be noted that some example embodiments are described as processing or methods depicted in flowcharts. Although multiple steps are described as sequential processing in the flowcharts, many of the steps may be implemented concurrently, coincidentally, or simultaneously. Additionally, the sequence of the multiple steps may be rearranged. The processing may be terminated when operations are completed, but the processing may further have additional steps that are not included in the drawings. The processing may correspond to a method, a function, a procedure, a subroutine, a subprogram, or the like.

Additionally, terms such as "first" and "second" may be used herein to describe multiple directions, actions, steps, elements, or the like, but these directions, actions, steps, or elements are not limited by the terms. The terms are only used for distinguishing a first direction, action, step, or element from another direction, action, step, or element. For example, without departing from the scope of embodiments of the present application, a first photodiode may be referred to as a second photodiode, and similarly, the second photodiode may be referred to as the first photodiode. Both the first photodiode and the second photodiode are photodiodes, but they are not the same photodiode. The terms such as "first" and "second" cannot be construed as indicating or implying relative importance or implicitly indicating the number of technical features as indicated. Thus, a feature defined as a "first" feature or a "second" feature may explicitly or implicitly include one or more of such features. As described in the embodiments of the present application, the term "multiple" is defined as at least two, for example, two, three, or the like, unless otherwise expressly limited.

FIG. 1 is a structure diagram of a visible light communication system according to embodiment one of the present application. This embodiment is applicable to the case where communication is performed in a manner of visible light communication. As shown in FIG. 1, the system includes a modulation and light emission module 100 configured to emit a communication light ray obtained by modulating information to be communicated; and a tracking and light sensing module 200 configured to receive and demodulate the communication light ray to obtain the information to be communicated and further configured to align the tracking and light sensing module 200 with the communication light ray according to the angle between the tracking and light sensing module 200 and the communication light ray.

Figure 2:
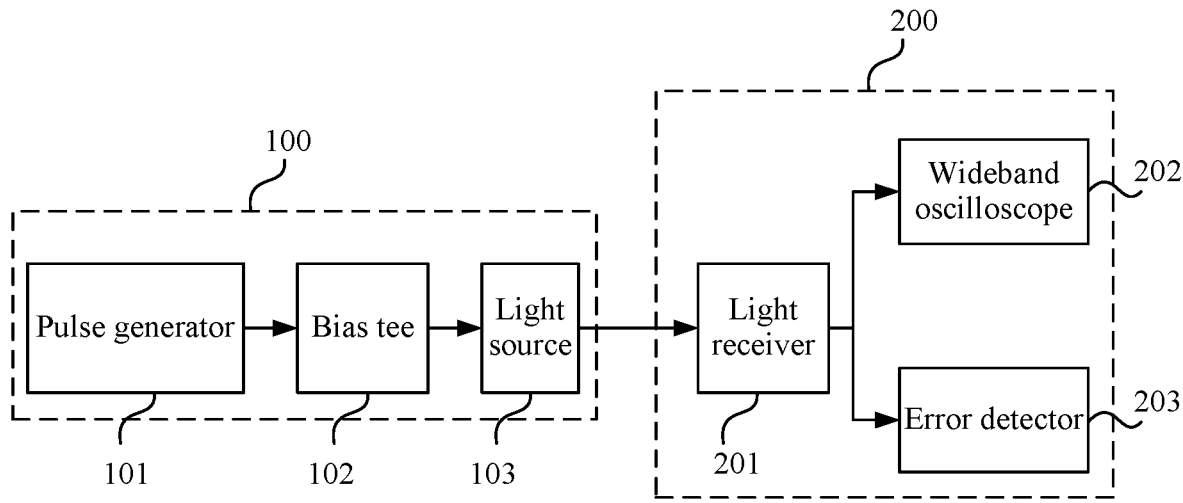
FIG. 2 is a structure diagram of another visible light communication system according to the present application.

Visible light communication refers to a communication manner in which light in a visible light waveband is used as an information carrier to directly transmit an optical signal in air. The information to be communicated may be modulated by the modulation and light emission module 100, that is, the information to be communicated is processed and loaded onto an optical carrier to be in a form suitable for visible light transmission so that the communication light ray is obtained, and then the communication light ray is emitted. The tracking and light sensing module 200 may be placed at a position directly facing a light source of the modulation and light emission module 100, so as to receive the communication light ray emitted from the modulation and light emission module 100 and improve the transmission performance of a VLC link. The tracking and light sensing module 200 may demodulate the communication light ray after receiving the communication light ray, thereby obtaining the required information to be communicated. Meanwhile, the tracking and light sensing module 200 may also adjust an angle at which the communication light ray is received. When detecting that a photosensitive plane of the tracking and light sensing module 200 does not directly face the communication light ray or deflects greatly from the direction in which the photosensitive plane directly faces the communication light ray, the tracking and light sensing module 200 may adjust the photosensitive plane along a direction opposite to the deflection direction, so as to achieve alignment. At an experimental stage, as shown in FIG. 2, the modulation and light emission module 100 may simulate and generate the required communication light ray through a pulse generator 101, drive a light modulator by using a bias tee 102, and emit the outputted communication light ray through a light source 103. Meanwhile, the tracking and light sensing module 200 may receive the communication light ray through a light receiver 201 and display the received communication light ray by using a wideband oscilloscope 202. An error detector 203 may be added to analyze a generated error. A free space distance between the modulation and light emission module 100 and the tracking and light sensing module 200 may be set to 80 cm. In an example, the modulation and light emission module 100 uses a gallium nitride (GaN) micro light-emitting diode (micro-LED) as a light source. A light-emitting diode (LED) is generally used as the light source in the visible light communication. Since a system bandwidth is mainly limited by an optoelectronic bandwidth of the LED and the GaN micro-LED has a relatively short carrier lifetime and relatively low junction capacitance, the GaN micro-LED may be scaled according to its dimensions so that the bandwidth can reach about 100 MHz. Correspondingly, since the GaN micro-LED is relatively small in dimension, optical power decreases from 100 mW to 1 mW. Therefore, the visible light communication system capable of achieving self-alignment in this embodiment is more important to achieve a VLC link with a high data rate. In an example, a modulation manner of the modulation and light emission module 100 is Non-Return-to-Zero On-Off Keying (NRZ-OOK). The GaN micro-LED and the NRZ-OOK are used for high-rate visible light communication, so that the visible light communication system in embodiments of the present application is insensitive to a spatial mode of incident light and a communication speed of the visible light communication system may reach 600 Mbps at a bit error rate (BER) of $2.1 \times 10^{-4}$, which is lower than that limited by forward error correction (FEC).

Figure 3:
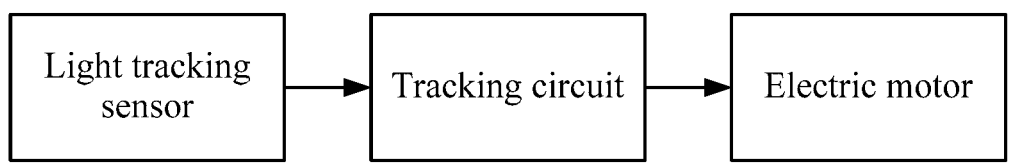
FIG. 3 is a structure diagram of a tracking and light sensing module according to the present application.

Based on the preceding technical solutions, in an exemplary embodiment, as shown in FIG. 3, the tracking and light sensing module 200 includes a light tracking sensor configured to generate light sensing signals of multiple regions according to amounts of the communication light ray received in different regions; a tracking circuit configured to generate a motor driving signal according to the light sensing signals of the multiple regions; and an electric motor configured to adjust a direction of a photosensitive plane of the light tracking sensor according to the motor driving signal to align the tracking and light sensing module with the communication light ray. The light tracking sensor may be used for light sensing as the light receiver 201. Moreover, light may be sensed in different regions of the light tracking sensor separately, and the angle between the photosensitive plane of the light tracking sensor and the communication light ray may be determined according to the amounts of the communication light ray received in the multiple regions. For example, the corresponding light sensing signals may be generated through the multiple regions of the light tracking sensor, and after multiple light sensing signals are obtained, the tracking circuit may analyze the multiple light sensing signals and determine a current deflection direction of the light tracking sensor to generate the motor driving signal. The tracking and light sensing module 200 may implement a mechanical rotation process for the alignment through the electric motor, where the electric motor may be a servo motor controlled through pulse-width modulation (PWM). Different motor driving signals may control the electric motor to deflect in different directions, and a mechanical transmission device is added between the electric motor and the light tracking sensor so that the direction of the photosensitive plane of the light tracking sensor can be adjusted through the electric motor, thereby tracking the communication light ray and pointing to the communication light ray. The light tracking sensor and the tracking circuit may be integrated on a complementary metal-oxide-semiconductor (CMOS) chip.

Figure 7:
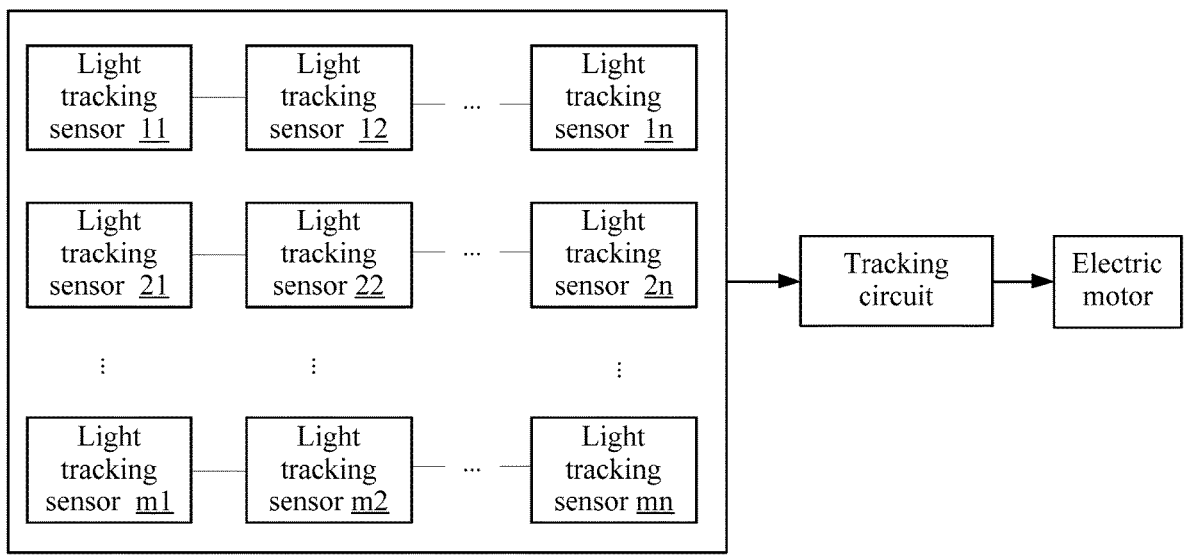
FIG. 7 is a structure diagram of another tracking and light sensing module according to the present application.

In an exemplary embodiment, multiple light tracking sensors are arranged in an array and connected in parallel, for example, as shown in FIG. 7, there are m rows and n columns of light tracking sensors, where both m and n are positive integers greater than 1. Since the light sensing signals generated by a single light tracking sensor are generally small, the multiple light tracking sensors connected in parallel may be used for obtaining relatively large light sensing signals, so as to clearly identify the light sensing signals. Meanwhile, the multiple light tracking sensors may be arranged in an array and placed in consistent directions, so as to ensure that maximum received optical power points of the multiple light tracking sensors are the same, thereby ensuring the accuracy of a result.

Figure 4:
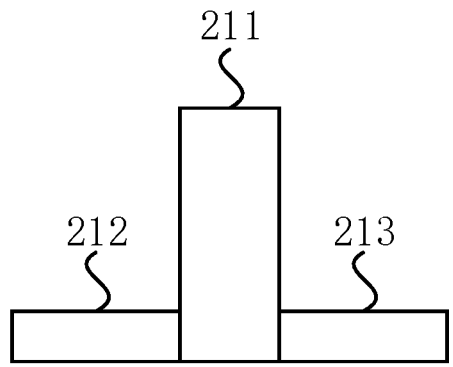
FIG. 4 is a structure diagram of a light tracking sensor according to the present application.

In an exemplary embodiment, as shown in FIG. 4, the light tracking sensor includes a metal wall 211, and a first photodiode 212 and a second photodiode 213 that are arranged on two sides of the metal wall 211, where the first photodiode 212 and the second photodiode 213 are configured to generate respective light sensing signals. The metal wall 211 may be created through a metal layer, a contact point, and a via in a stacking process, and the metal wall 211 is opaque to light. When the light tracking sensor deflects to a certain degree, an angle θ (not equal to 0) is formed between the communication light ray and the metal wall 211 and a micro-scale shadow is formed on a photodiode on one side, that is, an amount of the communication light ray received by the photodiode on one side is reduced and thus a photocurrent in the generated light sensing signal becomes smaller so that the deflection of the light tracking sensor can be determined according to different photocurrent values. In an example, the first photodiode 212 and the second photodiode 213 are the same in dimension, and the metal wall 211 is perpendicular to a photosensitive surface of the first photodiode 212 and perpendicular to a photosensitive surface of the second photodiode 213 so that it is more convenient to determine the deflection of the light tracking sensor according to the light sensing signals. The first photodiode 212 and the second photodiode 213 are the same in dimension, that is, the photosensitive surface of the first photodiode 212 and the photosensitive surface of the second photodiode 213 are the same in length and width. Meanwhile, the metal wall 211 is perpendicular to the photosensitive surfaces of the two photodiodes. When the communication light ray is incident in parallel with the metal wall 211 (θ=0), amounts of the communication light ray received by the first photodiode 212 and the second photodiode 213 are the same so that the two photodiodes generate the same photocurrent value. When the angle between the communication light ray and the metal wall 211 is θ (not equal to 0), the amount of the communication light ray received by the photodiode on one side is reduced so that the photodiode on one side generates a smaller photocurrent value than the photodiode on the other side. Two photocurrent values are directly compared so that the deflection of the light tracking sensor can be determined conveniently. For a relationship between the photocurrent values generated by the photodiodes on two sides and the angle θ, reference may be made to the following relationship:

$$\frac{I_L}{I_R} = \begin{cases} \frac{(1+\beta)L \cdot \cos\theta + \alpha H \cdot \sin\theta}{(1+\beta)L \cdot \cos\theta - H \cdot \sin\theta}, & \theta \geq 0 \\ \frac{(1+\beta)L \cdot \cos\theta + H \cdot \sin\theta}{(1+\beta)L \cdot \cos\theta - \alpha H \cdot \sin\theta}, & \theta \leq 0 \end{cases}$$

$I_L$ denotes a photocurrent generated by the first photodiode 212, $I_R$ denotes a photocurrent generated by the second photodiode 213, a denotes the ratio of reflected light to total light reaching the first photodiode 212 on a side of the metal wall 211, p denotes the ratio of reflected light to total light reaching the second photodiode 213 on the other side of the metal wall 211, H denotes the height of the metal wall 211, L denotes the length of each of the two photodiodes (in the direction perpendicular to the metal wall 211), where a and p depend on a process, a layout, and encapsulation and are constants. It may be determined from the relationship that a current ratio between $I_L$ and $I_R$ is independent of a light intensity and depends on only the angle θ. Considering a balance between a field of view and accuracy, the height of the metal wall 211 may be set to 12 μm, thereby optimizing the performance of the light tracking sensor. Meanwhile, the physical dimension 12 μm is much greater than a wavelength of absorbed light so that diffraction has a relatively small effect on the performance of the light tracking sensor.

In an exemplary embodiment, the tracking circuit includes a comparison unit configured to compare the light sensing signals of the multiple regions; and a switch unit including multiple switch transistors and configured to determine on/off states of the multiple switch transistors according to a comparison result of the comparison unit, control an access direction of a drive voltage of the electric motor according to the on/off states of the multiple switch transistors, and generate the motor driving signal according to the access direction of the drive voltage. The photocurrents generated by the first photodiode 212 and the second photodiode 213 may be compared by the comparison unit, and different switch transistors are controlled to be turned on or turned off under different comparison results so that the access direction of the drive voltage provided for the electric motor can be controlled, and different access directions may cause the electric motor to rotate in different directions, thereby achieving an alignment process.

Figure 5:
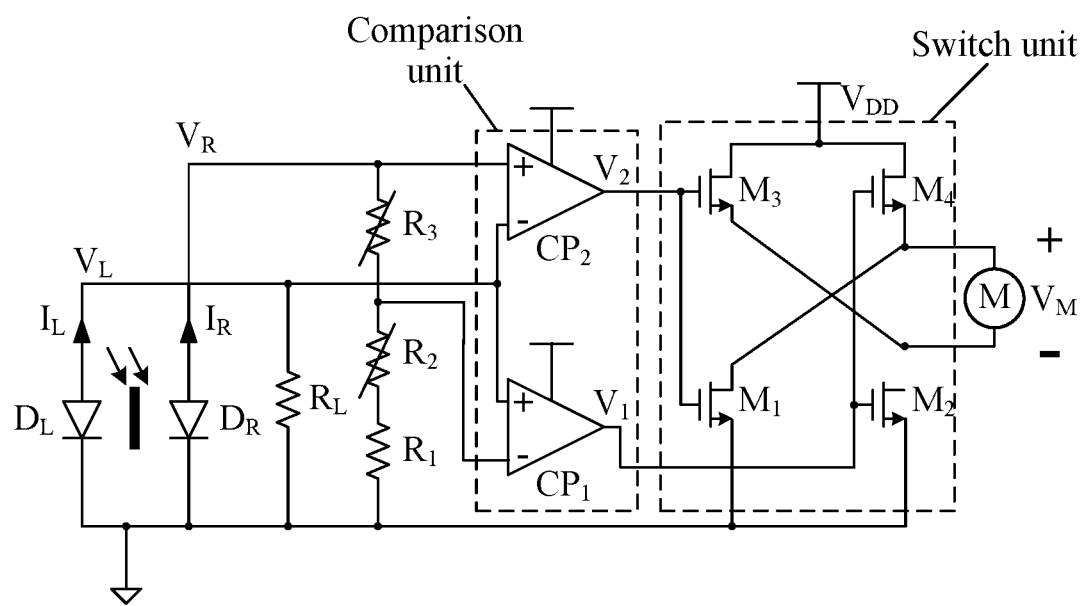
FIG. 5 is a circuit diagram of a tracking circuit according to the present application.

In an exemplary embodiment, as shown in FIG. 5, the comparison unit includes a first operational amplifier $CP_1$ and a second operational amplifier $CP_2$; where the first operational amplifier $CP_1$ has a positive input terminal connected to the first photodiode $D_L$ and a negative input terminal connected to the second photodiode $D_R$; and the second operational amplifier $CP_2$ has a positive input terminal connected to the second photodiode $D_R$ and a negative input terminal connected to the first photodiode $D_L$. The first operational amplifier $CP_1$ may determine an output voltage $V_1$ by comparing the magnitude of a voltage $V_L$ generated by the first photodiode $D_L$ with the magnitude of a voltage $V_R$ generated by the second photodiode $D_R$, and the second operational amplifier $CP_2$ may determine an output voltage $V_2$ by comparing the magnitude of the voltage $V_R$ generated by the second photodiode $D_R$ with the magnitude of the voltage $V_L$ generated by the first photodiode $D_L$. The voltage generated by the second photodiode $D_R$ may be divided by a first variable resistor $R_2$ and a second variable resistor $R_3$, and a divided voltage $V_X$ may be used as input into the negative input terminal of the first operational amplifier $CP_1$ so that certain redundancy exists in the comparison between the voltages generated by the two photodiodes. Therefore, only when the light tracking sensor deflects beyond a certain angle, can the alignment be performed, preventing the tracking and light sensing module 200 from always being in a quivering state and reducing consumption.

In an exemplary embodiment, the switch unit includes a first switch transistor $M_1$, a second switch transistor $M_2$, a third switch transistor $M_3$, and a fourth switch transistor $M_4$; where output of the first operational amplifier $CP_1$ is used for controlling the second switch transistor $M_2$ and the fourth switch transistor $M_4$ to be turned on or turned off, and output of the second operational amplifier $CP_2$ is used for controlling the first switch transistor $M_1$ and the third switch transistor $M_3$ to be turned on or turned off; in the case where the second switch transistor $M_2$ and the fourth switch transistor $M_4$ are turned on and the first switch transistor $M_1$ and the third switch transistor $M_3$ are turned off, a positive electrode of the electric motor M is connected to the drive voltage $V_{DD}$ and a negative electrode of the electric motor M is grounded, and in the case where the first switch transistor $M_1$ and the third switch transistor $M_3$ are turned on and the second switch transistor $M_2$ and the fourth switch transistor $M_4$ are turned off, the negative electrode of the electric motor M is connected to the drive voltage $V_{DD}$ and the positive electrode of the electric motor M is grounded. When the output voltage $V_1$ of the first operational amplifier $CP_1$ is positive, the second switch transistor $M_2$ and the fourth switch transistor $M_4$ may be controlled to be turned on so that the drive voltage $V_{DD}$ may sequentially flow through the second switch transistor $M_2$, the electric motor M (from the positive electrode to the negative electrode), and the fourth switch transistor $M_4$ and finally be grounded. When the output voltage $V_2$ of the second operational amplifier $CP_2$ is positive, the first switch transistor $M_1$ and the third switch transistor $M_3$ may be controlled to be turned on so that the drive voltage $V_{DD}$ may sequentially flow through the third switch transistor $M_3$, the electric motor M (from the negative electrode to the positive electrode), and the first switch transistor $M_1$ and finally be grounded. Whether the output voltage of the first operational amplifier $CP_1$ and the output voltage of the second operational amplifier $CP_2$ are positive or negative may be determined according to the magnitude of the photocurrent generated by the first photodiode $D_L$ and the magnitude of the photocurrent generated by the second photodiode $D_R$ so that the multiple switch transistors are controlled to be turned on or turned off and then the access direction of the drive voltage $V_{DD}$ of the electric motor M is controlled, so as to control the electric motor M to rotate in different directions. A direct current servo motor may be selected as the electric motor M to respond to a voltage difference so that the entire system is simple and reliable. When the electric motor M is stationary, a motor driver does not consume power so that for low-power applications, a static consumption current (around 88 microamperes) and the consumption (around 334 milliamperes) of the tracking and light sensing module are both low. According to simulation results, the system has good sensitivity to an incident angle and can achieve a tracking accuracy of 1.9° within a range of 120°. After tracking and alignment, received optical power, a signal-to-noise ratio, and a bit error rate are also greatly improved.

Figure 6:
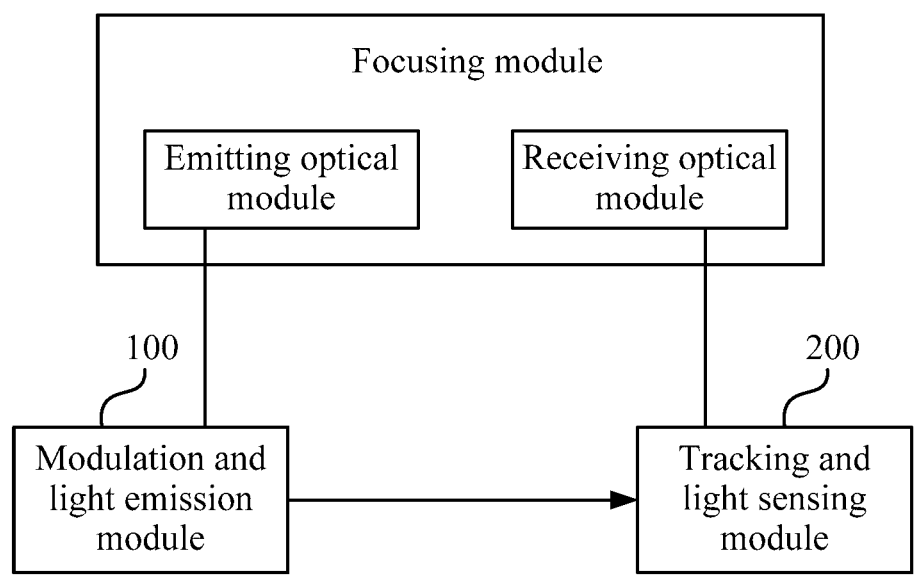
FIG. 6 is a structure diagram of another visible light communication system according to the present application.

Based on the preceding technical solutions, in an exemplary embodiment, the system further includes a focusing module configured to focus the communication light ray onto the tracking and light sensing module 200. When the GaN micro-LED is used as the light source, the optical power is relatively low and the field of view is relatively small. Therefore, compensation may be performed through focusing optics to further increase the data rate of the VLC link. As shown in FIG. 6, the focusing module may include an emitting optical module and a receiving optical module, where the emitting optical module is close to the modulation and light emission module 100 and may be configured to converge the communication light ray to a direction of an optic axis and emit the communication light ray into the receiving optical module, and the receiving optical module is close to the tracking and light sensing module 200 and may be configured to converge the communication light ray to the tracking and light sensing module 200, thereby improving the reception efficiency of the communication light ray.

The visible light communication system provided by embodiments of the present application includes the modulation and light emission module and the tracking and light sensing module, where the modulation and light emission module is configured to emit the communication light ray obtained by modulating the information to be communicated, and the tracking and light sensing module is configured to receive and demodulate the communication light ray to obtain the information to be communicated and further configured to align the tracking and light sensing module with the communication light ray according to the angle between the tracking and light sensing module and the communication light ray, thereby achieving self-alignment at a receiving end. Moreover, real-time alignment can be implemented according to a change of the angle during use, improving the received optical power, the signal-to-noise ratio, and the bit error rate in a visible light communication process and expanding the field of view of the receiving end.

What is claimed is:
1. A visible light communication system, comprising:
   a modulation and light emission module configured to emit a communication light ray obtained by modulating information to be communicated; and
   a tracking and light sensing module configured to receive and demodulate the communication light ray to obtain the information to be communicated and further configured to align the tracking and light sensing module with the communication light ray according to an angle between the tracking and light sensing module and the communication light ray;

wherein the tracking and light sensing module comprises:
a light tracking sensor configured to generate light sensing signals of a plurality of regions according to amounts of the communication light ray received in different regions;
a tracking circuit configured to generate a motor driving signal according to the light sensing signals of the plurality of regions; and
an electric motor configured to adjust a direction of a photosensitive plane of the light tracking sensor according to the motor driving signal to align the tracking and light sensing module with the communication light ray;

wherein the light tracking sensor comprises a metal wall, and a first photodiode and a second photodiode that are arranged on two sides of the metal wall, wherein the first photodiode and the second photodiode are configured to generate respective light sensing signals;

wherein the tracking circuit comprises:
a comparison unit configured to compare the light sensing signals of the plurality of regions; and
a switch unit comprising a plurality of switch transistors and configured to determine on/off states of the plurality of switch transistors according to a comparison result of the comparison unit, control an access direction of a drive voltage of the electric motor according to the on/off states of the plurality of switch transistors, and generate the motor driving signal according to the access direction of the drive voltage.

2. The visible light communication system according to claim 1, wherein the first photodiode and the second photodiode are the same in dimension, and the metal wall is perpendicular to a photosensitive surface of the first photodiode and perpendicular to a photosensitive surface of the second photodiode.

3. The visible light communication system according to claim 1, wherein the comparison unit comprises a first operational amplifier and a second operational amplifier; wherein the first operational amplifier has a positive input terminal connected to the first photodiode and a negative input terminal connected to the second photodiode; and the second operational amplifier has a positive input terminal connected to the second photodiode and a negative input terminal connected to the first photodiode.

4. The visible light communication system according to claim 3, wherein the switch unit comprises a first switch transistor, a second switch transistor, a third switch transistor, and a fourth switch transistor; wherein output of the first operational amplifier is used for controlling the second switch transistor and the fourth switch transistor to be turned on or turned off, and output of the second operational amplifier is used for controlling the first switch transistor and the third switch transistor to be turned on or turned off; in a case where the second switch transistor and the fourth switch transistor are turned on and the first switch transistor and the third switch transistor are turned off, a positive electrode of the electric motor is connected to the drive voltage and a negative electrode of the electric motor is grounded, and in a case where the first switch transistor and the third switch transistor are turned on and the second switch transistor and the fourth switch transistor are turned off, the negative electrode of the electric motor is connected to the drive voltage and the positive electrode of the electric motor is grounded.

5. The visible light communication system according to claim 1, wherein a plurality of light tracking sensors are arranged in an array and connected in parallel.

6. The visible light communication system according to claim 1, wherein the modulation and light emission module uses a gallium nitride micro light-emitting diode (micro-LED) as a light source, and a modulation manner of the modulation and light emission module is Non-Return-to-Zero On-Off Keying.

7. The visible light communication system according to claim 1, further comprising a focusing module configured to focus the communication light ray onto the tracking and light sensing module.

* * * * *